US010620440B2

(12) United States Patent
Vallius et al.

(10) Patent No.: US 10,620,440 B2
(45) Date of Patent: Apr. 14, 2020

(54) WAVEGUIDE FOR GENERATING OVERLAPPING IMAGES IN A DISPLAY MODULE

(71) Applicant: Microsoft Technology Licensing, LLC, Redmond, WA (US)

(72) Inventors: Tuomas Heikki Sakari Vallius, Espoo (FI); Lauri Tuomas Sainiemi, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 15/820,970

(22) Filed: Nov. 22, 2017

(65) Prior Publication Data

US 2019/0155032 A1   May 23, 2019

(51) Int. Cl.
| | | |
|---|---|---|
| G02B 5/18 | (2006.01) | |
| G02B 27/01 | (2006.01) | |
| F21V 8/00 | (2006.01) | |
| G02B 27/42 | (2006.01) | |

(52) U.S. Cl.
CPC ....... *G02B 27/0172* (2013.01); *G02B 5/1823* (2013.01); *G02B 6/0038* (2013.01); *G02B 6/0076* (2013.01); *G02B 27/4205* (2013.01); *G02B 27/4272* (2013.01); *G02B 2027/0112* (2013.01); *G02B 2027/0125* (2013.01); *G02B 2027/0132* (2013.01)

(58) Field of Classification Search
CPC ...... G02B 5/32; G02B 5/1852; G02B 5/1814; G02B 27/0081

USPC .................................. 359/34, 462, 630, 569
See application file for complete search history.

(56) References Cited

U.S. PATENT DOCUMENTS

| | | | |
|---|---|---|---|
| 9,933,684 B2 * | 4/2018 | Brown ...................... G02F 1/29 |
| 10,042,096 B2 * | 8/2018 | Simmonds ......... G02B 27/0081 |
| 2006/0132914 A1 * | 6/2006 | Weiss ...................... G02B 5/32 |
| | | | 359/462 |
| 2006/0221448 A1 | 10/2006 | Nivon et al. | |
| 2010/0214659 A1 | 8/2010 | Levola | |
| 2011/0019258 A1 | 1/2011 | Levola | |

OTHER PUBLICATIONS

"International Search Report and Written Opinion Issued in PCT Application No. PCT/US2018/060206", dated Apr. 5, 2019, 11 pages.

\* cited by examiner

*Primary Examiner* — Audrey Y Chang
(74) *Attorney, Agent, or Firm* — Arent Fox LLP

(57) ABSTRACT

Aspects described herein generally relate to a waveguide and/or an associated display apparatus. The waveguide includes a plurality of optical input ports configured to receive optical light, at least one optical output port configured to output at least a modified portion of the optical light, and a plurality of transmission channels, each coupled to one of the plurality of optical input ports and configured to transmit the optical light from a respective optical input port to the at least one optical output port. The plurality of transmission channels are arranged to cause the optical light diffracted from at least a first one of the plurality of transmission channels to partially overlap, at the at least one optical output port, with the optical light diffracted from at least a second one of the plurality of transmission channels.

18 Claims, 7 Drawing Sheets

WAVEGUIDE FOR GENERATING OVERLAPPING IMAGES IN A DISPLAY MODULE

BACKGROUND

Near-eye display (NED) devices typically include separate waveguides for the left eye and the right eye of a user wearing the display. The waveguides each include a projector that produces a small pupil of optical light to a circular in-coupling region of the waveguide, which can be referred to as an optical input port, and a diffractive optical element that expands the pupil horizontally and diffracts the light downward towards an output port. The output port couples to the display module to display an image, such as a left eye image from a left eye waveguide in a left eye region of the display module, and a right eye image from a right eye waveguide in a right eye region of the display module.

The display module is positioned at an eye-relief distance from the user's eye to account for the user possibly wearing spectacles, varying head shapes and eye locations, etc. Problems can arise when the field-of-view output by the waveguides extends beyond a threshold (e.g., 60 degrees) where one eye can gaze both left and right waveguides at the same time. This can cause confusion as each waveguide includes only portions of an image intended for the given eye. In addition, a mechanical interference between the left and right waveguides can set a hard limit to the waveguide lateral size, which can exacerbate this issue as the eye-relief distance increases. Other smart glass display technologies, such as free form prisms and curved reflectors, may exhibit similar issues.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a waveguide for a display apparatus is provided. The waveguide includes a plurality of optical input ports configured to receive optical light, at least one optical output port configured to output at least a modified portion of the optical light, and a plurality of transmission channels, each coupled to one of the plurality of optical input ports and configured to transmit the optical light from a respective optical input port to the at least one optical output port. The plurality of transmission channels are arranged to cause the optical light diffracted from at least a first one of the plurality of transmission channels to partially overlap, at the at least one optical output port, with the optical light diffracted from at least a second one of the plurality of transmission channels.

In another example, a display apparatus is provided that includes a display module comprising a plurality of optical output ports, each configured to project optical light, and a light engine configured to generate the optical light for each of the plurality of optical output ports, and a waveguide comprising a plurality of optical input ports each optically coupled to one of the plurality of optical output ports of the display module to receive optical light. The waveguide includes at least one optical output port configured to output at least a modified portion of the optical light, a plurality of transmission channels, each coupled to one of the plurality of optical input ports and configured to transmit the optical light from a respective optical input port to the at least one optical output port. The plurality of transmission channels are arranged to cause the optical light diffracted from at least a first one of the plurality of transmission channels to partially overlap, at the at least one optical output port, with the optical light diffracted from at least a second one of the plurality of transmission channels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
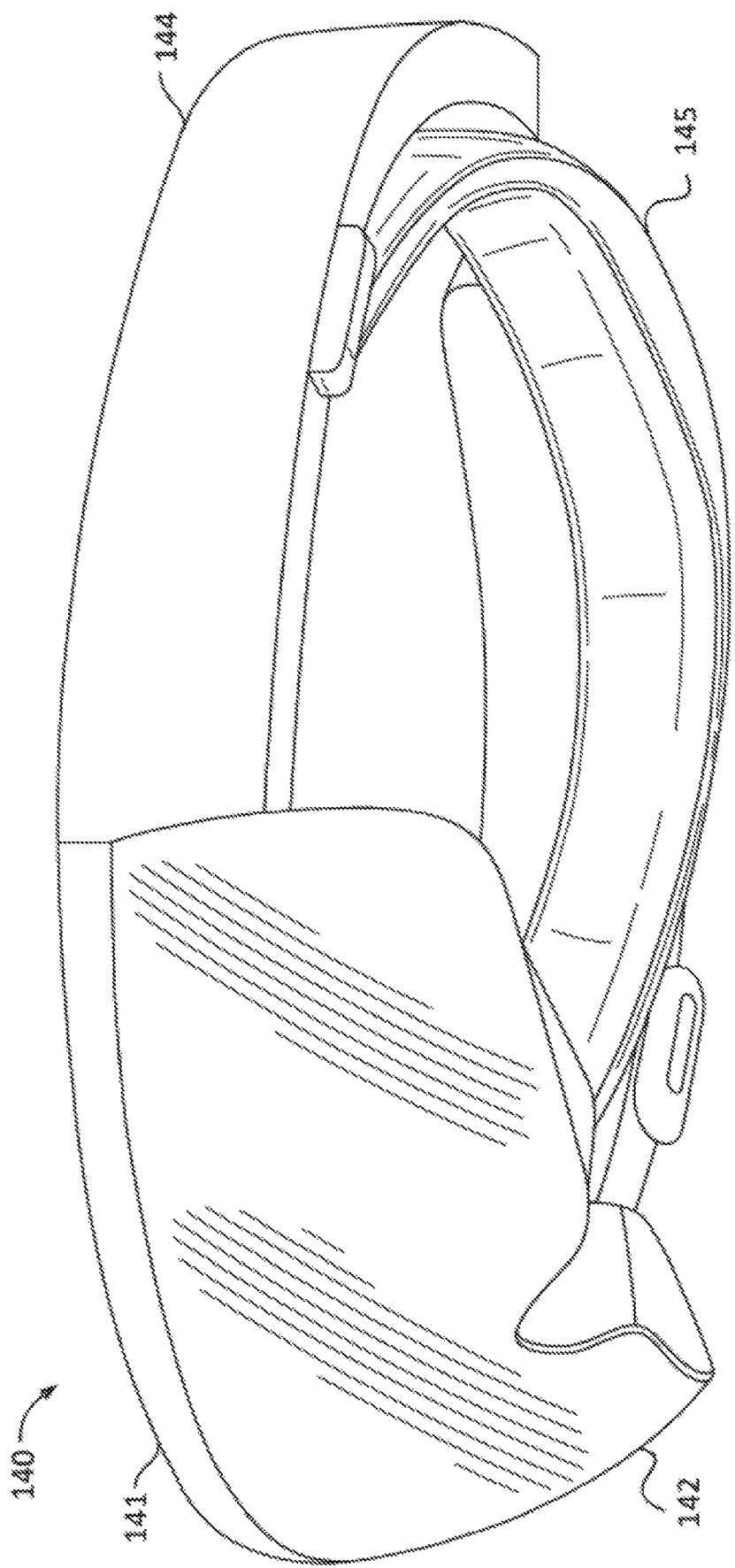
FIG. 1 illustrates a schematic diagram of an example of a near-eye display (NED) device in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The following description generally assumes that a "user" of a display device is a human. Note, however, that a display device according to the examples disclosed herein can potentially be used by a user that is not human, such as a machine or an animal. Hence, the term "user" can refer to any of those possibilities, except as may be otherwise stated or evident from the context. Further, except where stated otherwise, the term "eye" is used herein as a general term to refer to an optical receptor of any type of user of a display device, and therefore can refer to a human eye, an animal eye, or a machine-implemented optical sensor designed to detect an image in a manner analogous to a human eye, etc.

Near-eye display (NED) devices can include optical systems for spatially translating a pupil from one position to another position, for example from a microdisplay imager to an eye of a user. This optical system is sometimes referred to as a pupil relay system. An NED device can include one or more transparent waveguides arranged so that they are located directly in front of each eye of the user when the NED device is worn by the user, to project light representing generated images into the eye of the user. With such a configuration, images generated by the NED device can be overlaid on the user's view of the surrounding physical environment. Waveguides configured for use in NED devices include reflective surfaces configured to propagate light rays through reflective technologies, such as total internal reflection (TIR). One aspect of translating a pupil from one position to another via a waveguide includes receiving the light rays into the waveguide (e.g., at an "in-coupling" region defined at a first location) and outputting the light rays from the waveguide (e.g., at an "out-coupling" region defined at a second location). Light rays can be in-coupled to and out-coupled from a waveguide via a diffractive optical element (DOE) that functions as an input port or an output port for the light rays. A DOE can include a diffraction grating structure, for example but not limited to a surface relief diffraction grating (SRG).

Described herein are various aspects related to a waveguide of a display module that is configured to produce multiple regions of optical light that may at least partially overlap at an out-coupling region (e.g., at least one optical output port) to provide transverse propagation. For example, the waveguide can include multiple optical input ports that receive optical light at respective in-coupling regions. Each optical input port can be optically coupled to a DOE that diffracts the optical light to the at least one optical output port. The DOEs can be configured such that the diffracted optical light from the multiple DOEs can overlap in at least one region at the optical output port. This configuration provides a more optimal image for viewing in the display module where a first eye of a user gazes near or into a region of the at least one optical output port that includes an image for a second eye (or outside of a region intended for the first eye), effectively expanding the configurable field-of-view for the user.

In one example, to achieve the overlapping region, the configuration of the DOEs can be such that the DOEs themselves overlap in at least one plane and are orthogonal. For example, the overlapping DOEs may also be positioned on opposing sides of the waveguide, and the optical light received in each respective optical input port can be diffracted downward into the waveguide such that the diffracted optical light from each DOEs also at least partially overlaps in an out-coupling region.

In another example, to achieve the overlapping region, the configuration of the DOEs can be part of a larger DOE that includes a first DOE portion with a first grating structure, a second DOE portion with a second grating structure, and an overlapping portion between the first optical element portion and the second optical element portion, where the overlapping portion has a cross-grating structure. For example, the cross-grating structure can include grating in a direction of the first grating structure as well as additional grating in a direction of the second grating structure. Thus, optical light diffracted into opposing ends of the cross-grating structure can form the overlapping diffracted optical light.

Turning now to FIGS. 1-6, examples are depicted with reference to one or more components. Although operations described may be presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions, where applicable.

FIG. 1 shows an example of a near-eye display (NED) device in which the techniques introduced herein can be incorporated. The NED device 140 may provide virtual reality (VR) and/or augmented reality (AR) display modes for displaying incoming optical light, images (e.g., frames of video), etc., which may be visualized by a user wearing the NED device.

In the example of FIG. 1, the NED device 140 includes a chassis 141, a transparent protective visor 142 mounted to the chassis 141, and left and right side arms 144 mounted to the chassis 141. The visor 142 can form a protective enclosure for various display elements (not shown) that are discussed below.

The chassis 141 can be the mounting structure for the visor 142 and side arms 144, as well as for various sensors and other components (not shown) that are not described for ease of explanation. A display assembly (not shown) that can generate images for AR visualization can also be mounted to the chassis 141 and/or enclosed within the protective visor 142. The visor 142 and/or chassis 141 may also house electronics (not shown) to control the functionality of the display assembly and other functions of the NED device 140. The NED device 140 can further include an adjustable headband 145 attached to the chassis 141, by which the NED device 140 can be worn on a user's head.

Figure 2A:
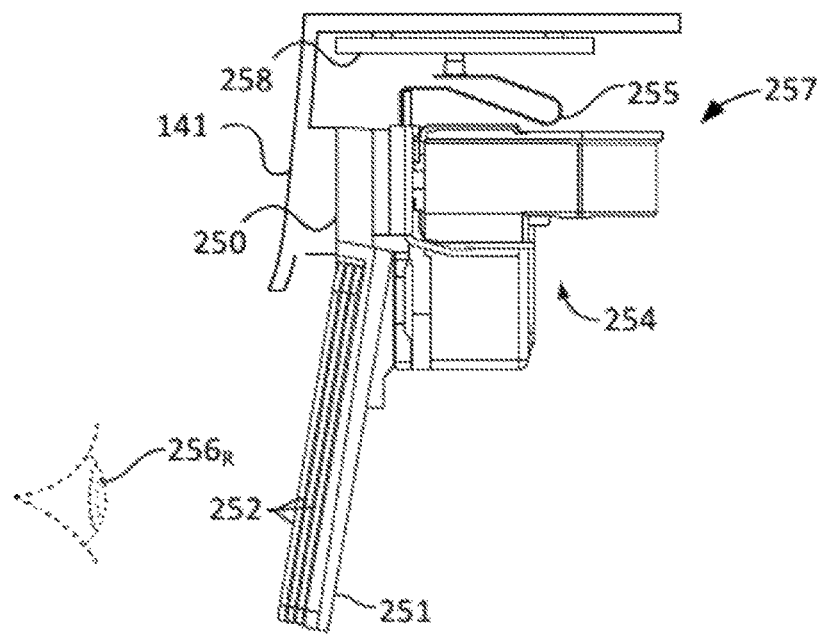
FIG. 2A illustrates an example of a side view of display components that may be included within a NED device in accordance with aspects described herein.
Figure 2B:
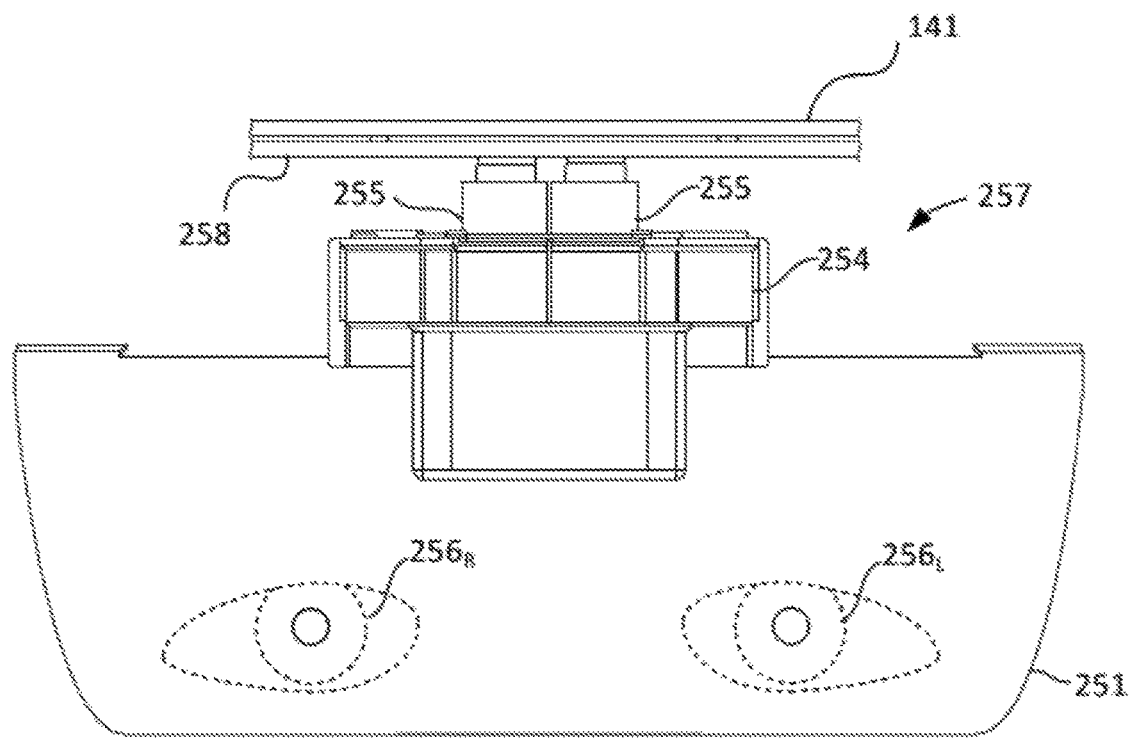
FIG. 2B illustrates an example of a front view of display components that may be included within a NED device in accordance with aspects described herein.

FIGS. 2A and 2B show, in accordance with certain examples, right side and front orthogonal views, respectively, of display components that may be included within the visor 142 of the NED device 140. During operation of the NED device 140, the display components can be positioned relative to the user's left eye 256L and right eye 256R as shown. The display components can be mounted to an interior surface of the chassis 141. The chassis 141 is shown in cross-section in FIG. 2A.

The display components are designed to overlay three-dimensional images on the user's view of his real-world environment, e.g., by projecting light into the user's eyes, or otherwise onto a surface that can be viewed by the user's eyes. Accordingly, the display components include a display module 254 that houses a light engine including components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 254 may be connected via a flexible circuit connector 255 to a printed circuit board 258 that has image generation/control electronics (not shown) mounted on it.

The display components further include a transparent waveguide carrier 251 to which the display module 254 is mounted, and one or more transparent waveguides 252 stacked on the user's side of the waveguide carrier 251, for each of the left eye and right eye of the user. One or more waveguides 252 are stacked on each of the left and right waveguide mounting surfaces of the waveguide carrier 251, to project light emitted from the display module and representing images into the left eye 256L and right eye 256R, respectively, of the user. The display assembly 257 can be mounted to the chassis 141 through a center tab 250 located at the top of the waveguide carrier 251.

Figure 3:
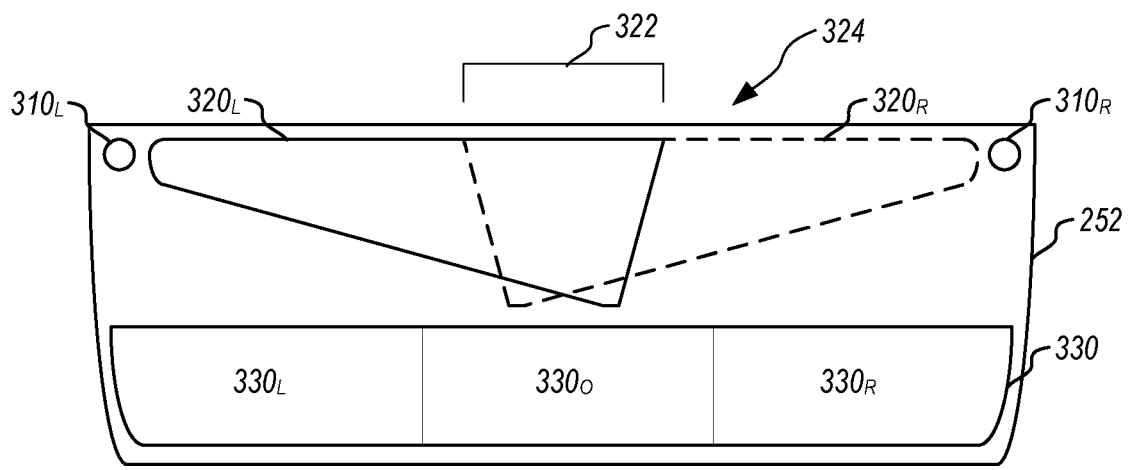
FIG. 3 illustrates a front perspective view of an example of a waveguide with overlapping transmission channels in accordance with aspects described herein.

FIG. 3 shows a front perspective view of an example design for a waveguide 252 that can be mounted on the waveguide carrier 251 (FIG. 2) to convey optical light, which can be viewed by eyes of the user. As described, for example, the waveguide 252 can convey optical light for two eyes (e.g., a left eye and a right eye). The waveguide 252 can be transparent and, in the examples shown in FIGS. 2A and 2B, can be disposed directly in front of the eyes of the user during operation of the NED device. The waveguide 252, for example, is shown as viewed from the user's perspective during operation of the NED device 140.

The waveguide 252 includes optical input ports $310_L$ and $310_R$ (also referred to as in-coupling elements) that receive optical light, e.g., respective left and right eye images, at respective in-coupling regions that are located on opposing ends of the waveguide 252 in this example. The optical input ports $310_L$ and $310_R$, in this example, are substantially circularly shaped and can each capture a pupil of optical light, though other shapes for the optical input ports may be used. In certain examples the optical input ports $310_L$ and $310_R$ can be, or can include, a DOE which can include but is not limited to, for example, a surface diffraction grating, volume diffraction grating, a Switchable Bragg Grating (SBG), etc. The waveguide 252 can further include an optical output port 330 (also referred to as an out-coupling element) that projects optical light at a respective out-coupling region. As with the optical input ports $310_L$ and $310_R$, in some examples, the optical output port 330 can be, or can include, a DOE which can include but is not limited to, for example, a surface diffraction grating, volume diffraction grating, an SBG, etc. The waveguide 252 can also include transmission channels $320_L$ and $320_R$ for respectively conveying light from the optical input ports $310_L$ and $310_R$ to the optical output port 330. The transmission channels $320_L$ and $320_R$ may include, for example, DOE, which can include but are not limited to, for example, a surface diffraction grating, volume diffraction grating, a reflective component such as a substrate with multiple internally reflective surfaces, etc. The transmission channels $320_L$ and $320_R$ may be designed to accomplish this by use of total internal reflection (TIR).

According to the present disclosure, the transmission channels $320_L$ and $320_R$ further include an overlapping structure 324 in an overlapping region 322 to cause the optical light diffracted from the transmission channels $320_L$ and $320_R$ to partially overlap at an overlapped portion $330_O$ of an optical output port 330. As such, the overlapping structure 324 defines an overlapping transmission channel defined by the respective transmission channels $320_L$ and $320_R$ as overlapped in the overlapping region 322. The overlapping structure 324 may be different diffractive structures in different, spaced apart planes, e.g., different structures in different transmission channel elements on different sides of the waveguide 252 (see, e.g., FIG. 4), or a combined structure in a same plane, e.g., a multi-diffractive structures in a single, integral transmission channel element on one side of the waveguide 252 (see, e.g., FIG. 5). As such, the overlapping structure 324 is configured to project both left and right eye images simultaneously on the overlapped portion $330_O$ of the optical output port 330. Even though two different images are projected to the same area, e.g., the overlapped portion $330_O$ of the optical output port 330, due to the overlapping provided by the overlapping structure 324, each eye may only be able to see its respective image. Thus, the waveguide 252 with the transmission channels $320_L$ and $320_R$ that include the overlapping structure 324 accordingly expand the field of view of each eye to include the overlapped portion $330_O$ of the optical output port 330, as is explained further below.

In operation with a display module (e.g., display module 254 in FIG. 2), for example, one or more output ports of the display module can be optically coupled (but not necessarily physically coupled) to the optical input ports $310_L$ and $310_R$ of the waveguide 252. In one example, during operation, the display module 254 (not shown in FIG. 3) can output optical light representing an image for the left eye from a left-eye output port of the display module 254 into the optical input port $310_L$ of the waveguide 252 and/or can output optical light representing an image for the right eye from a right-eye output port of the display module 254 into the optical input port $310_R$ of the waveguide 252. The optical light received at the optical input ports $310_L$ and $310_R$ can be expanded (e.g., horizontally in a line or plane) and diffracted downward (e.g., to another plane) by the transmission channels $320_L$, $320_R$, and the corresponding overlapping region, to the optical output port 330. Optical light representing the images for the left and right eyes can then be projected from the optical output port 330 to the user's eyes.

In this regard, for example, the optical output port 330 can include, or can be configured to output optical light to, a single output module intended to be viewed by both the left and right eyes of a user such that the optical output port 330 can generate a binocular image intended to be viewed by both eyes. Additionally, in this regard, for example, the optical input ports $310_L$ and $310_R$ of the waveguide 252 can respectively in-couple left and right portions of a binocular field-of-view, such that the optical light input into the waveguide 252 includes the left and right portions of the binocular field-of-view, and thus the corresponding output image includes left, right, and overlapping portions of the binocular field-of-view. As described further herein, in this example, the optical input ports $310_L$ and $310_R$ of the waveguide 252 can be positioned on opposing sides of a nose bridge (e.g., on opposing sides of a display module and/or near the temples of a user) such that the corresponding portions of optical light input into the optical input ports $310_L$ and $310_R$ crosses the nose bridge, and the corresponding output image that is output from the waveguide 252, having the overlapping structure 324, into the optical output port 330 can also cross the nose bridge before it is received at the user's eyes.

Figure 4:
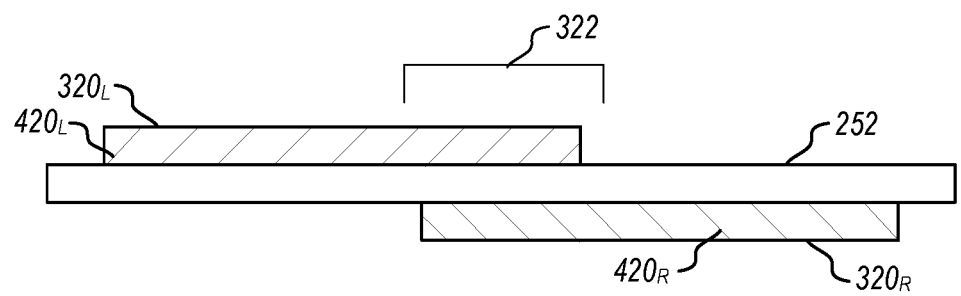
FIG. 4 illustrates a top perspective view of an example of a waveguide with orthogonal and overlapping transmission channels in accordance with aspects described herein.

In the example of FIG. 4, which shows a top perspective view of one example of the waveguide 252, the overlapping structure 324 of the transmission channels $320_L$ and $320_R$ can be an orthogonal overlapping structure defined in and by different transmission channel elements $420_L$ and $420_R$ that respectively overlap in the overlap region 322 in different, substantially parallel, spaced apart planes. In one example, to facilitate the overlap of the transmission channels $320_L$ and $320_R$ that can conceptually define an overlap transmission channel in the overlap region 322, the transmission channel elements $420_L$ and $420_R$ can be positioned on opposing sides of the waveguide 252, e.g., in spaced apart, substantially parallel, vertical planes. For example, the transmission channel elements $420_L$ and $420_R$ can have different structures to cause different diffraction properties of received optical light. For example, the transmission channel elements $420_L$ and $420_R$ may have respective grating lines configured at opposing angles (e.g., angles that are 90 degrees relative to one another) to transmit the associated optical light and provide the overlapping region 322. In this regard, the optical light diffracted from transmission channel $320_L$ to the optical output port 330 can at least partially overlap the optical light diffracted from transmission channel $320_R$ to the optical output port 330. As such, optical output port 330 can project an image that is intended for the left eye on a left portion $330_L$ of the optical output port 330, an image that is intended for the right eye on a right portion $330_R$ of the optical output port 330, and an overlapped image on an overlapped portion $330_O$ of the optical output port 330. Thus, a first eye of the user (e.g., the left eye) can gaze toward the right and view the projected portion of the first eye image in the overlapped portion $330_O$, rather than viewing only the end of a relatively smaller field of view first eye image (e.g., the right end of the left image) or a part of a second eye image (e.g., the left end of the right image) as in conventional devices. Similarly, a second eye of the user (e.g., the right eye) can gaze toward the left and view the projected portion of the second eye image in the overlapped portion $330_O$, rather than viewing only the end of a relatively smaller field of view second eye image (e.g., the left end of the right image) or a part of the first eye image (e.g., the right end of the left image), as in conventional devices.

Figure 5:
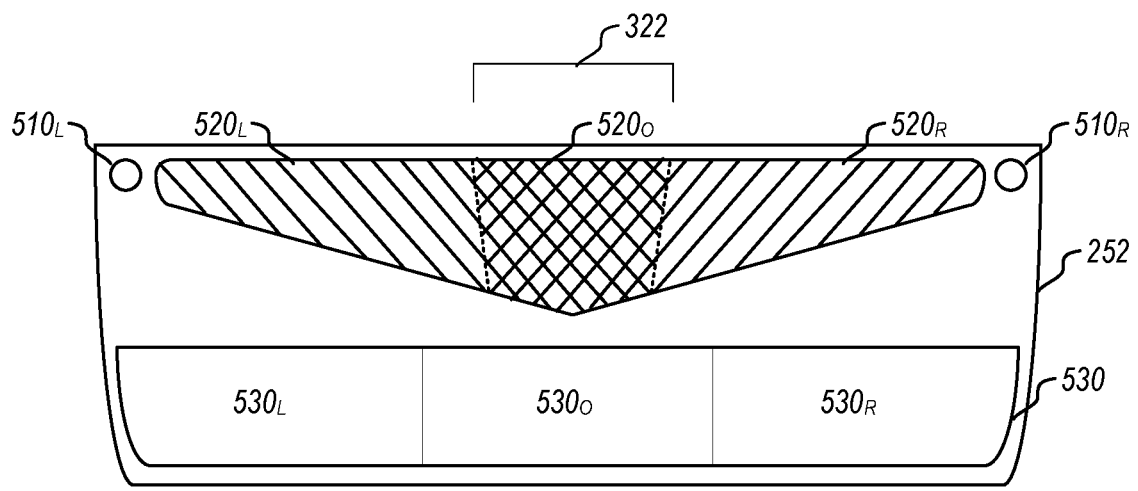
FIG. 5 illustrates a front perspective view of an example of a waveguide with multiple transmission channels and an overlapping region in accordance with aspects described herein.

In the example of FIG. 5, which shows a front view of the waveguide 252, the transmission channels $520_L$ and $520_R$ (e.g., transmission channels $320_L$ and $320_R$ in FIG. 3) are defined in a single, integral transmission channel element having an overlapping structure 324 defined in multi-diffractive features in a same plane in the overlap region 322. For instance, transmission channel $520_L$ can have a first grating structure with multiple substantially parallel grating lines formed at a first angle (e.g., substantially 45 degrees) in a first direction, transmission channel $520_R$ can have a second grating structure with substantially parallel grating lines formed at a second angle (e.g., substantially 45 degrees) in a second direction, where the first and second angles can be similar or different (e.g., and/or offset by another angle, such as substantially 90 degrees), and the overlapping structure in overlapping region 322 can be defined by a cross-grated structure including cross-grated lines at the first angle in the first direction and at the second angle in the second direction (e.g., doubly periodic gratings). As such, the cross-grated structure defines the transmission channel $520_O$. The grating lines of each transmission channel $520_L$, $520_R$, $520_O$ can include, e.g., pits, grooves, etc. formed into the transmission channel $520_O$ to diffract optical light. In this example, the optical light received via optical input port $510_L$ can be diffracted by the transmission channel $520_L$ and $520_O$, and the optical light received via optical input port $510_R$ can be diffracted by the transmission channel $520_R$ and $520_O$. Thus, the optical light from both optical input ports $510_L$ and $510_R$ can overlap at transmission channel $520_O$. The respective transmission channels $520_L$, $520_R$, and $520_O$ can be diffracted to the optical output port 530 into portions $530_L$, $530_R$, and $530_O$, respectively. In this regard, optical output port 530 can project an image that is intended for the left eye on a left portion $530_L$ of the optical output port 530, an image that is intended for the right eye on a right portion $530_R$ of the optical output port 530, and an overlapped image on an overlapped portion $530_O$ of the optical output port 530. Thus, a first eye of the user (e.g., the left eye) can gaze toward the right and view the projected portion of the first eye image in the overlapped portion $530_O$, rather than viewing only the end of a relatively smaller field of view first eye image (e.g., the right end of the left image) or a part of a second eye image (e.g., the left end of the right image) as in conventional devices. Similarly, a second eye of the user (e.g., the right eye) can gaze toward the left and view the projected portion of the second eye image in the overlapped portion $530_O$, rather than viewing only the end of a relatively smaller field of view second eye image (e.g., the left end of the right image) or a part of the first eye image (e.g., the right end of the left image), as in conventional devices.

In operation with a display module (e.g., display module 254 in FIG. 2), for example, one or more output ports of the display module can be optically coupled (but not necessarily physically coupled) to the optical input ports $510_L$ and $510_R$ of the waveguide 252. In one example, during operation, the display module 254 (not shown in FIG. 5) can output optical light representing an image for the left eye from a left-eye output port of the display module 254 into the optical input port $510_L$ of the waveguide 252 and/or can output optical light representing an image for the right eye from a right-eye output port of the display module 254 into the optical input port $510_R$ of the waveguide 252. The optical light received at the optical input ports $510_L$ and $510_R$ can be expanded (e.g., horizontally in a line or plane) and diffracted downward (e.g., to another plane) by the transmission channels $520_L$, $520_R$, and $520_O$ to the optical output port 530, as described. Optical light representing the images for the left and right eyes can then be projected from the optical output port 330 to the user's eyes, as described.

In this regard, the overlapping structure 324 of the waveguide 252 can include orthogonal DOE structures so that the left and right field-of-view can propagate to the same location without one eye being able to see in the DOE designed for the adjacent eye. Accordingly, the DOE structures are overlapping at the center, either at the opposite sides of the waveguide or on the same side, forming crossed gratings.

In addition, for example, the optical output port 530 can include, or can be configured to output optical light to, a single output module intended to be viewed by both the left and right eyes of a user such that the optical output port 530 can generate a binocular image intended to be viewed by both eyes. Additionally, in this regard, for example, the optical input ports $510_L$ and $510_R$ of the waveguide 252 can respectively in-couple left and right portions of a binocular field-of-view, such that the optical light input into the waveguide 252 includes the left and right portions of the binocular field-of-view, and thus the corresponding output image includes left, right, and overlapping portions of the binocular field-of-view. As described further herein, in this example, the optical input ports $510_L$ and $510_R$ of the waveguide 252 can be positioned on opposing sides of a nose bridge (e.g., on opposing sides of a display module and/or near the temples of a user) such that the corresponding portions of optical light input into the optical input ports $510_L$ and $510_R$ crosses the nose bridge, and the corresponding output image that is output from the waveguide 252, having the overlapping structure 524, into the optical output port 530 can also cross the nose bridge before it is received at the user's eyes.

In the examples shown and described above, one optical input port is shown, but additional optical input ports may be configured on the waveguide to facilitate receiving optical light for providing to respective transmission channels (e.g., and/or a given transmission channel may be optically coupled to more than one optical input port). Moreover, each portion of an image produced by diffracting the optical light from the respective optical input port (e.g., the left portion, right portion, and/or overlapped portion described above) can include all of the color components that are present in the complete image, e.g., red, green and blue color components. The portions of the image may be generated in a tiled manner, i.e., where they are spatially contiguous and non-overlapping, or they may at least partially overlap spatially. Further, in other examples, rather than generating left and right portions of the image, the separate portions of the image could be upper and lower portions of the image, or the image could be spatially divided in some other manner, which may or may not depend on the position of the optical input ports.

Additionally, the examples of the waveguide 252 described above could have more than two optical output ports 330, 530, in which case the image can be projected to the eye of the user in the form of three or more separate image portions. Hence, in at least some examples, different portions of an image for a given eye of the user are generated and input simultaneously into separate input ports of a waveguide, then reintegrated within the waveguide and projected into the eye of the user as a single integrated image, to produce a larger FOV with the image having an overlapping portion (e.g., at or near the middle). In any case, the transmission channels can have an orthogonal and overlapping structure with respect to the waveguide so the left and right eye field-of-view can propagate at the same location without seeing the diffracted optical light intended for the adjacent eye. In other examples, the separate portions of the image could be input to the waveguide in a time division multiplexed manner, rather than simultaneously. Further, in some examples, the physical placement of the optical input ports on the waveguide may be different from that shown in FIGS. 3A and 4. For example, the optical input ports could be spaced apart vertically on the waveguide rather than, or in addition to, horizontally.

Figure 6:
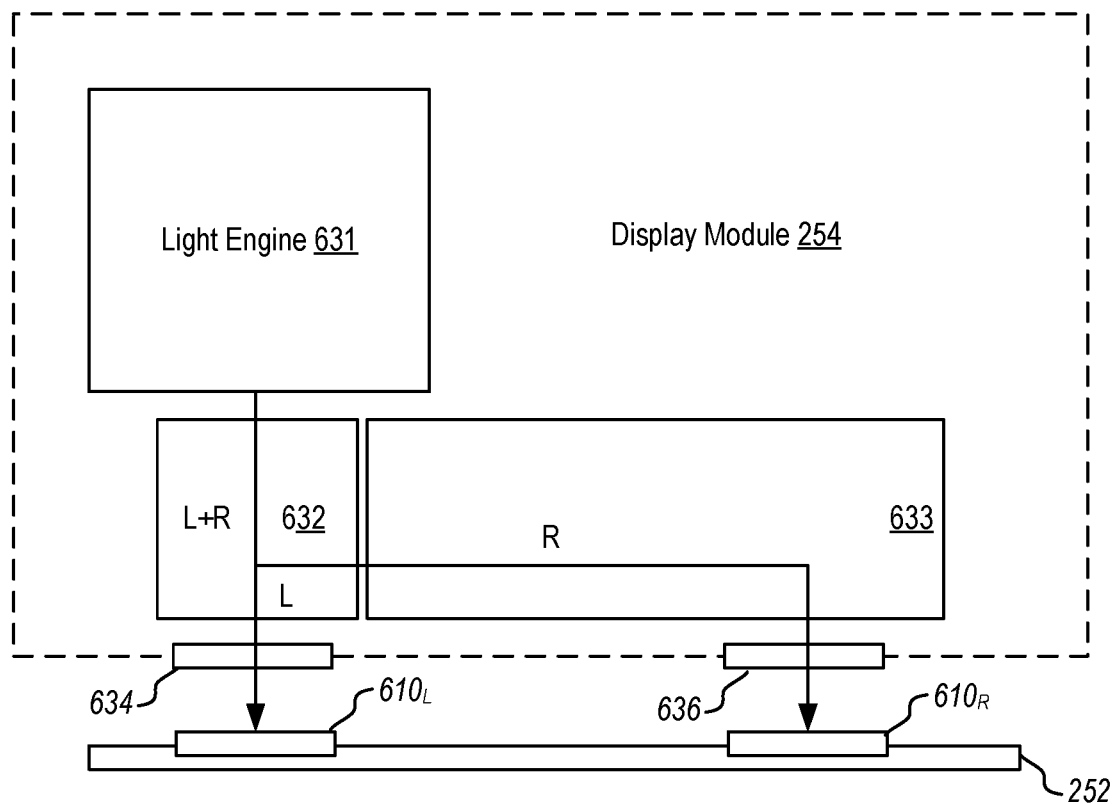
FIG. 6 is a schematic diagram that illustrates components of an example of a display module that may be included within the NED device in accordance with aspects described herein.

FIG. 6 schematically shows an example of a display module 254 configured for use with a NED device such as NED device 140 in FIGS. 2A-2B. Note, that example display module 254 shown in FIG. 6 is configured for use with a waveguide having multiple optical input ports as shown at example waveguides 252 in FIGS. 3, 4, and 5. Similar principles can be applied for a display module configured for use with fewer or more optical input ports.

As shown in FIG. 6, display module 354 includes a light engine 631, an optical switch 632 and a pupil relay 633. In some examples, the light engine 631 includes one or more light sources (not shown), such as one or more colored LEDs. For example, the light engine 631 can include red, green and blue LEDs to produce the red, green and blue color components, respectively, of the image. Additionally, the light engine 631 includes at least one microdisplay imager (not shown), such as an LCOS imager, LCD or DMD; and may further include one or more lenses, beam splitters, waveguides, and/or other optical components (not shown).

The optical switch 632 controls the propagation direction of the light output by the light engine 631, representing each particular portion of the image, to one of two different optical paths. In the illustrated example, the first path is for the left half of the image and leads to an output port 634 of the display module 254 that is coupled to one corresponding optical input port $610_L$, which may be similar to optical input port $310_L$, $510_L$, etc., of the waveguide 252. The other optical path is for the right portion of the image and includes a pupil relay 633, which propagates that portion of the image to a second output port 636 of the display module 254, which is optically coupled to a second corresponding optical input port $610_R$, which may be similar to optical input port $310_R$, $510_R$, etc. of the waveguide 252. Thus, the image produced for the output ports 634, 636 can be a binocular image intended to be consumed in left and right portions, respectively, by the optical input ports $610_L$, $610_R$.

The optical switch 632 selectively controls the propagation direction of light from the light engine 631 based on a switching criterion, such as polarization. For example, one half of the image may have s-polarization while the other half of image has p-polarization, where the optical switch 632 conveys s-polarized light along one optical path and conveys p-polarized light along the other optical path. The switch 632 can be, for example, an LCD mirror that either transmits light or acts as a perfect mirror, depending on the applied voltage. Note, however, that a switching criterion (or criteria) other than polarization could be used. For example, time division multiplexing could be used to switch between the optical paths. The optical switch 632, therefore, can enable a single light engine 631 to provide two pupils for an image to two separate optical input ports $610_L$, $610_R$ on a waveguide 252. In an example waveguide with only one input port, optical switch 632 may direct light emitted from light engine 631 to the single optical input port.

The pupil relay 633 may be optional and may enable larger distances between the optical input ports $610_L$, $610_R$ on the waveguide 252. The pupil relay 633 may be constructed using any known or convenient method and materials for transferring an image pupil from one location to another. For example, the pupil relay 633 may be constructed from a sequence of paraxial lenses that focus the pupil to an intermediate image and then collimate it, followed by a mirror to redirect the light into the corresponding input port of the waveguide.

Figure 7:
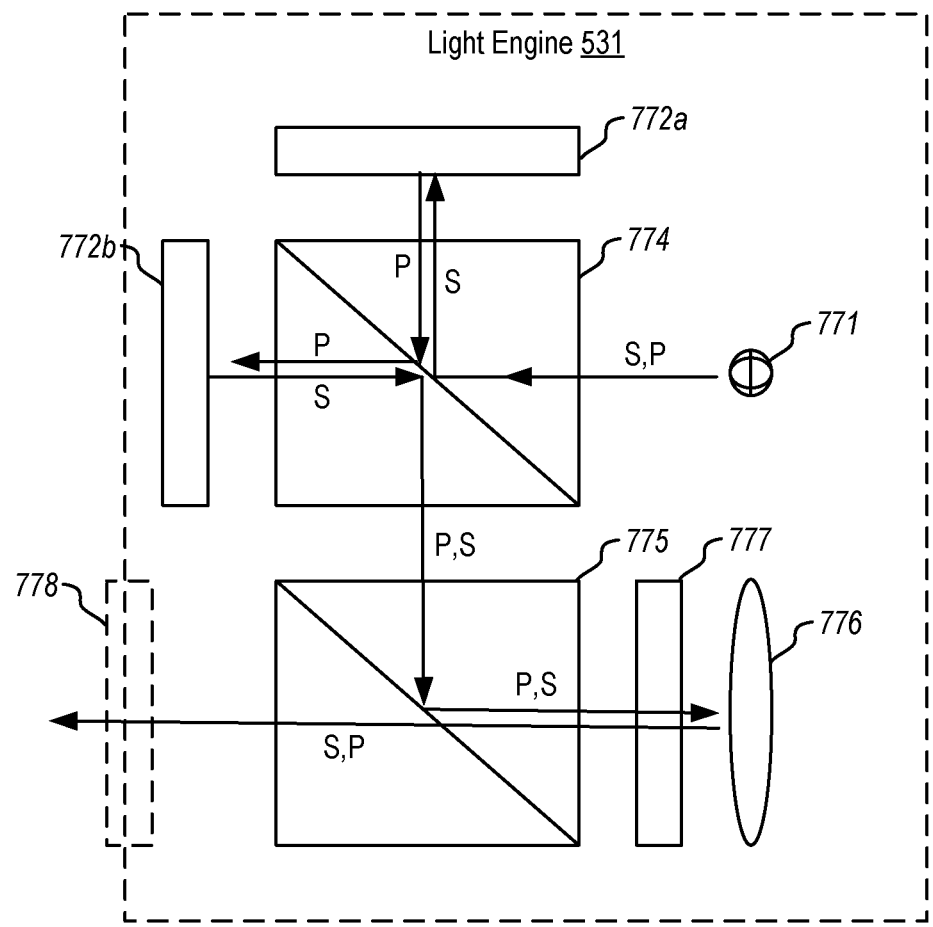
FIG. 7 is a schematic diagram that illustrates components of an example of a light engine configured for use with a display module in accordance with aspects described herein.

FIG. 7 schematically illustrates an example of light engine 631 including certain relevant components. The view in FIG. 7 is from a side (e.g., the right side) of the display module 254. Note that some examples may include other active and/or passive components, not shown. The light engine 631 in the illustrated example includes at least one light source 771, such as a color LED. Although only one light source 771 is shown in FIG. 7, there may be multiple light sources provided for each eye of the user, e.g., one for each color component of whatever color model is being employed (e.g., red, green and blue). The same or a similar configuration as shown in FIG. 7 can be used to combine light from such multiple light sources.

The light engine 631 further includes one or more imagers (e.g., LCOS microdisplays) 772a and 772b that generate an image intended for display to a particular eye of the user. Note that the example light engine 631 shown in FIG. 7 includes two imagers 772a and 772b, however another light engine may include one or more than two imagers. In the case of multiple imagers 772a and 772b, each imager may generate a portion of the image to be displayed to the user. A retarder (e.g., quarter-wave plate) can be placed before the waveguide at one of the waveguide inputs to have optimum polarization entering the waveguide.

Additionally, the light engine 631 can include a combination of polarizing beam splitters (PBSs) 774, 775, one or more reflective lenses 776 and one or more quarter-wave plates 777, that generate and propagate the image(s) through the output port 778 of the light engine 631. In the example shown in FIG. 7, a first PBS 774 reflects s-polarized light from the light source 771 upward to a first microdisplay imager 772a, which generates one portion of the image. The PBS 774 also causes p-polarized light from the light source 771 to be propagated straight through to the other microdisplay imager 772b, which produces a second portion of the image. Both portions of the image (separately constituting s-polarized and p-polarized light) then propagate downward through the PBS 774 to a second PBS 775, which directs them to birdbath-shaped reflective lenses 776 via quarter-wave plates (retarders) 777. The image portions are then reflected back by the reflective lenses 776 through the quarter-wave plates 777 and then through the PBS 775. From there, the image portions are output through the output port 778 of the light engine 631 and provided to additional optics in the display module 254, as shown by the example in FIG. 6.

Using the overlapping transmission channels in the example waveguides described herein may enable some form factors for the NED devices that are not feasible using current solutions. In an example, the optical input ports can be positioned at or near a temple area (e.g., in the area of the temples of a user when the NED device is worn) since left and right portions of the image meet at the center, where a detector may be used to maintain binocular alignment. Also the eye relief can be increased to enable for example transparent motorbike, automotive, etc. displays with large fields-of-view.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Several aspects of NED devices have been described above with reference to various systems and methods. One or more portions of these systems and methods may have been described or illustrated in the accompanying drawings by various blocks, modules, components, circuits, steps, processes, algorithms, etc. (collectively referred to as "elements"). One or more of these elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A waveguide for a display apparatus, comprising:
   a plurality of optical input ports configured to receive optical light representing a left portion and a right portion of a binocular field-of-view;
   at least one optical output port configured to output at least a modified portion of the optical light; and
   a plurality of transmission channels, each coupled to one of the plurality of optical input ports and configured to transmit the optical light from a respective optical input port to the at least one optical output port to generate a binocular image in the at least one optical output port,
   wherein the plurality of transmission channels are arranged such that at least a first one of the plurality of transmission channels is on a first planar surface of the waveguide and at least a second one of the plurality of transmission channels is on a second planar surface of the waveguide, wherein the first planar surface and the second planar surface are each at an opposing side of the waveguide, such that the waveguide is situated in between the first one of the plurality of transmission channels and the second one of the plurality of transmission channels, and
   wherein the plurality of transmission channels are arranged such that, in at least one view, at least the first one of the plurality of transmission channels is at least partially overlapping at least the second one of the plurality of transmission channels, such to cause the optical light diffracted from at least a first one of the plurality of transmission channels to partially overlap, at the at least one optical output port, with the optical light diffracted from at least a second one of the plurality of transmission channels.

2. The waveguide of claim 1, wherein the plurality of transmission channels are arranged to include, in the at least one view, an overlapping region between the first one of the plurality of transmission channels and at least the second one of the plurality of transmission channels.

3. The waveguide of claim 2, wherein at least the first one of the plurality of transmission channels comprises first grating lines formed at a first angle, at least the second one of the plurality of transmission channels comprises second grating lines formed at a second angle, and wherein the overlapping region comprises cross-grated lines formed at the first angle and the second angle to cause the optical light diffracted from at least a first one of the plurality of transmission channels to partially overlap with the optical light diffracted from at least a second one of the plurality of transmission channels.

4. The waveguide of claim 3, wherein the first angle and the second angle differ by substantially 90 degrees.

5. The waveguide of claim 3, wherein at least one of the first grating lines, the second grating lines, or the cross-grated lines are formed by at least one of a surface diffraction grating, a volume diffraction grating, or a Switchable Bragg Grating (SBG).

6. The waveguide of claim 1, wherein the plurality of optical input ports are substantially circularly shaped and configured to receive the optical light as respective pupils of light.

7. The waveguide of claim 6, wherein the plurality of transmission channels are diffractive optical elements for diffracting the optical light.

8. The waveguide of claim 7, wherein the diffractive optical elements are configured to expand, for the respective optical input port, one of the respective pupils of light and diffract the expanded pupil of light to a plane, wherein first optical light diffracted from at least the first one of the diffractive optical elements partially overlaps, in the plane and at the at least one optical output port, second light diffracted from at least the second one of the diffractive optical elements.

9. The waveguide of claim 1, wherein the plurality of optical input ports are configured on opposing ends of the display apparatus to receive the optical light for representing the optical light from the opposing ends of the display apparatus.

10. The waveguide of claim 1, wherein the display apparatus comprises a display module for outputting the optical light diffracted to the at least one optical output port.

11. A display apparatus, comprising:
a display module comprising a plurality of optical output ports, each configured to project optical light, and a light engine configured to generate the optical light for each of the plurality of optical output ports; and
a waveguide comprising a plurality of optical input ports each optically coupled to one of the plurality of optical output ports of the display module to receive the optical light representing a left portion and a right portion of a binocular field-of-view, wherein the waveguide further comprises:
at least one optical output port of the plurality of optical output ports configured to output at least a modified portion of the optical light; and
a plurality of transmission channels, each coupled to one of the plurality of optical input ports and configured to transmit the optical light from a respective optical input port to the at least one optical output port to generate a binocular image in the at least one optical output port,
wherein the plurality of transmission channels are arranged such that at least a first one of the plurality of transmission channels is on a first planar surface of the waveguide and at least a second one of the plurality of transmission channels is on a second planar surface of the waveguide, wherein the first planar surface and the second planar surface are each at an opposing side of the waveguide, such that the waveguide is situated in between the first one of the plurality of transmission channels and the second one of the plurality of transmission channels, and
wherein the plurality of transmission channels are arranged such that, in at least one view, at least the first one of the plurality of transmission channels is at least partially overlapping at least the second one of the plurality of transmission channels, such to cause the optical light diffracted from at least a first one of the plurality of transmission channels to partially overlap, at the at least one optical output port, with the optical light diffracted from at least a second one of the plurality of transmission channels.

12. The display apparatus of claim 11, wherein the plurality of transmission channels are arranged to include an overlapping region, in the at least one view, between the first one of the plurality of transmission channels and at least the second one of the plurality of transmission channels.

13. The display apparatus of claim 12, wherein at least the first one of the plurality of transmission channels comprises first grating lines formed at a first angle, at least the second one of the plurality of transmission channels comprises second grating lines formed at a second angle, and wherein the overlapping region comprises cross-grated lines formed at the first angle and the second angle to cause the optical light diffracted from at least a first one of the plurality of transmission channels to partially overlap with the optical light diffracted from at least a second one of the plurality of transmission channels.

14. The display apparatus of claim 13, wherein the first angle and the second angle differ by substantially 90 degrees.

15. The display apparatus of claim 11, wherein the plurality of optical input ports are configured near a temple area on opposing ends of the display apparatus to receive the optical light for representing the optical light from the opposing ends of the display apparatus.

16. The display apparatus of claim 11, wherein the light engine is configured to output color light from at least one of a light emitting diode (LED), a liquid crystal on silicon (LCOS), a liquid crystal display (LCD), a digital micromirror device (DMD), one or more lenses, or one or more beam splitters.

17. The display apparatus of claim 11, wherein the plurality of optical input ports are substantially circularly shaped and configured to receive the optical light as respective pupils of light.

18. The display apparatus of claim 17, wherein the plurality of transmission channels are diffractive optical elements for diffracting the optical light.

\* \* \* \* \*